(12) United States Patent
Jeon et al.

(10) Patent No.: US 12,175,460 B2
(45) Date of Patent: Dec. 24, 2024

(54) METHOD AND DEVICE FOR DETERMINING TRANSFER INFORMATION IN MESSAGE THROUGH NATURAL LANGUAGE PROCESSING BASED ON DEEP LEARNING

(71) Applicant: KakaoBank Corp., Seongnam-si (KR)

(72) Inventors: Sang Hyun Jeon, Seongnam-si (KR); Dong Hwa Shin, Seongnam-si (KR); Jae Eui Sohn, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 0 days.

(21) Appl. No.: 18/578,512

(22) PCT Filed: Jul. 11, 2022

(86) PCT No.: PCT/KR2022/010031
§ 371 (c)(1),
(2) Date: Jan. 11, 2024

(87) PCT Pub. No.: WO2023/287132
PCT Pub. Date: Jan. 19, 2023

(65) Prior Publication Data
US 2024/0257118 A1 Aug. 1, 2024

(30) Foreign Application Priority Data
Jul. 12, 2021 (KR) .................. 10-2021-0091088

(51) Int. Cl.
*G06Q 20/38* (2012.01)
*G06F 40/284* (2020.01)
*G06Q 20/10* (2012.01)

(52) U.S. Cl.
CPC ......... *G06Q 20/386* (2020.05); *G06F 40/284* (2020.01); *G06Q 20/10* (2013.01)

(58) Field of Classification Search
CPC ..... G06Q 20/386; G06Q 20/10; G06F 40/284
(Continued)

(56) References Cited

U.S. PATENT DOCUMENTS 9,842,105 B2 * 12/2017 Bellegarda ............. G06N 3/045
10,366,158 B2 * 7/2019 Bellegarda ............. G06N 3/02
(Continued)

FOREIGN PATENT DOCUMENTS

CN 112668326 B * 3/2024
CN 113469367 B * 5/2024 ............. G06F 30/27
(Continued)

OTHER PUBLICATIONS

Liu Z, Huang D, Huang K, Li Z, Zhao J. Finbert: A pre-trained financial language representation model for financial text mining. In Proceedings of the twenty-ninth international conference on international joint conferences on artificial intelligence Jan. 7, 2021 (pp. 4513-4519). (Year: 2021).*

(Continued)

*Primary Examiner* — Sara C Hamilton
(74) *Attorney, Agent, or Firm* — WHDA, LLP

(57) ABSTRACT

The present invention discloses a transfer information determination method and device through deep learning, by which a determination is made on whether transfer information is included in a message, and the transfer information is classified. A method for determining transfer information within a message through natural language processing based on deep learning according to the present invention comprises the steps of: pre-processing an acquired message in a user terminal according to a reference word; extracting an embedding vector corresponding to each segmented text from the preprocessed message to determine whether transfer information is included, through weighted calculation of the extracted embedding vector; and classifying the transfer (Continued)

information within the pre-processed message determined to include the transfer information. According to the present invention, it is possible to increase the classification efficiency of transfer information within a message by preferentially determining whether transfer information is included, using a low-capacity embedding-based determination model.

11 Claims, 7 Drawing Sheets

(58) Field of Classification Search
USPC .......................................................... 705/39
See application file for complete search history.

(56) References Cited

U.S. PATENT DOCUMENTS

| | | | |
|---|---|---|---|
| 10,423,948 B1* | 9/2019 | Wilson | G06Q 20/386 |
| 10,521,466 B2* | 12/2019 | Bellegarda | G06F 3/16 |
| 10,657,461 B2* | 5/2020 | McMahan | G06N 3/098 |
| 10,963,637 B2 | 3/2021 | Wang | |
| 11,238,849 B1* | 2/2022 | Mimassi | G10L 15/07 |
| 11,475,350 B2* | 10/2022 | McMahan | H04L 67/10 |
| 11,763,093 B2* | 9/2023 | Beigi | G06N 3/045 |
| | | | 704/9 |
| 2018/0018562 A1 | 1/2018 | Jung | |
| 2018/0053114 A1* | 2/2018 | Adjaoute | G06N 3/02 |
| 2019/0220514 A1 | 7/2019 | Wang | |
| 2020/0027019 A1* | 1/2020 | Yang | G07F 9/001 |
| 2020/0401886 A1* | 12/2020 | Deng | G06N 3/08 |
| 2021/0374689 A1* | 12/2021 | Bansal | G06Q 20/02 |
| 2022/0230149 A1* | 7/2022 | Greenbacker | G06Q 40/02 |
| 2022/0230155 A1* | 7/2022 | Greenbacker | G06Q 20/308 |
| 2022/0230236 A1* | 7/2022 | Dolan | G06F 18/2411 |
| 2022/0414661 A1* | 12/2022 | Hassanzadeh | G06N 3/04 |
| 2024/0005341 A1* | 1/2024 | Ouyang | G06N 20/00 |

FOREIGN PATENT DOCUMENTS

| | | | | |
|---|---|---|---|---|
| CN | 113516151 B | * | 7/2024 | ........... G06F 18/213 |
| DE | 102021108101 A1 | * | 12/2021 | ......... G06F 16/2379 |
| EP | 3143560 B1 | * | 3/2024 | ............. G06N 20/00 |
| KR | 10-2015-0106613 A | | 9/2015 | |
| KR | 10-2017-0044075 | | 4/2017 | |
| KR | 10-2018-0008247 | | 1/2018 | |
| KR | 10-2019-0085098 A | | 7/2019 | |
| KR | 10-2019-0098928 | | 8/2019 | |
| KR | 10-2019-0115652 | | 10/2019 | |
| KR | 10-2020-0028561 | | 3/2020 | |
| KR | 20230129006 A | * | 9/2023 | |
| WO | WO-2021247448 A1 | * | 12/2021 | ............. G06N 3/084 |

OTHER PUBLICATIONS

Huang J, Chai J, Cho S. Deep learning in finance and banking: A literature review and classification. Frontiers of Business Research in China. Dec. 2020;14(1):13. (Year: 2020).*

Torfi A, Shirvani RA, Keneshloo Y, Tavaf N, Fox EA. Natural language processing advancements by deep learning: A survey. arXiv preprint arXiv:2003.01200. Mar. 2, 2020. (Year: 2020).*

Collobert R, Weston J. A unified architecture for natural language processing: Deep neural networks with multitask learning. InProceedings of the 25th international conference on Machine learning Jul. 5, 2008 (pp. 160-167). (Year: 2008).*

International Search Report dated Oct. 20, 2022, issued in counterpart International Application No. PCT/KR2022/010031, with English Translation. (5 pages).

Written Opinion of the International Searching Authority (Form PCT/ISA/237) dated Oct. 20, 2022, issued in counterpart International Application No. PCT/KR2022/010031. (4 pages).

Request for the Submission of an Opinion dated May 8, 2023, issued in counterpart of Korea Patent Application No. 10-2021-0091088, with English Translation. (14 pages).

Written Decision on Registration dated Dec. 4, 2023, issued in counterpart of Korea Patent Application No. 10-2021-0091088, with English Translation. (5 pages).

* cited by examiner

METHOD AND DEVICE FOR DETERMINING TRANSFER INFORMATION IN MESSAGE THROUGH NATURAL LANGUAGE PROCESSING BASED ON DEEP LEARNING

TECHNICAL FIELD

The present invention relates to method and device for determining whether transfer information is included in a message through deep learning, and classifying the transfer information.

BACKGROUND ART

In accordance with the development of smartphones and mobile communication technology, a user may now simply and conveniently use functions that were previously performed offline anytime and anywhere. In particular, the user may process most financial transactions in a non-face-to-face manner by using a financial application on the smartphone, thus having improved convenience in financial activities in daily life.

There have also been services such as phone banking and internet banking. However, in order to transfer funds, the user had to directly view and input transfer information, such as the account number and bank name of a transfer target, included in the target's message exchanged with the user online in addition to saving or memorizing the target's account number. Therefore, to avoid this inconvenience, a financial application may have recently allowed the transfer information included in the message or copied transfer information to access the financial application. In this case, the user may be provided with a function to extract the transfer information directly from a content of the message and input the same into the financial application.

However, a conventional transfer information determination function may use a unique pattern of characters included in the message, and this character pattern may have various cases depending on the user's feature. It may thus be difficult to accurately recognize the transfer information.

In addition, in order to improve such a shortcoming, various patterns reflecting personalized features may be defined in a table. In this case, the table itself may require large capacity, and it may thus be difficult to use the table for a mobile device such as the smartphone.

As a result, there is a need for a method for determining transfer information available to the smartphone by using fewer resources while accurately determining the transfer information in the message.

DISCLOSURE

Technical Problem

An object of the present invention is to provide a method for more accurately determining transfer information in a message while using a low-capacity determination model.

In more detail, an object of the present invention is to provide a more efficient method for determining transfer information by combining natural language processing based on deep learning with a regular expression-based determination method.

In addition, an object of the present invention is to provide a method of training a transfer information determination model to reflect a feature of a personalized message and minimize usage of personal information.

Technical Solution

According to an embodiment of the present invention, provided is a method for determining transfer information in a message through natural language processing based on deep learning, the method including: preprocessing an acquired message in a user terminal based on a reference word; extracting an embedding vector corresponding to each segmented text from the preprocessed message to determine whether the transfer information is included in the message through weighted calculation of the extracted embedding vector; and classifying the transfer information in the preprocessed message determined to include the transfer information.

The preprocessing an acquired message comprises may comprise segmenting the acquired message by adding spaces before and after a position of the number or specific word, for the number or specific word included in the message.

The extracting an embedding vector may comprise determining whether the transfer information may be included in the acquired message is determined through a local model operated on the user terminal, and the local model may configured to generate training information of a layer performing internal weighted calculation by using a determination result of whether the transfer information is included in the message.

The local model may configured to updated using a master model distributed through federated training with the training information generated from the plurality of user terminals.

The determining whether the transfer information is included in the message may comprise determining the transfer information is included in the message by using a first expected inclusion probability of the transfer information in the acquired message that is calculated by the local model, and a second expected inclusion probability of the transfer information in the acquired message that is calculated by the master model.

The classifying of the transfer information may comprise classifying the transfer information in the message may be classified by using a regular expression that defines a text pattern for each category as grammar.

The classifying of the transfer information may comprise classifying the transfer information in the message may be classified by inputting the preprocessed message into a neural network model trained to classify the transfer information.

According to another embodiment of the present invention, provided is an application operated on a user terminal and determining transfer information in a message, the application including: a preprocessing unit preprocessing an acquired message in the user terminal based on a reference word; a transfer information determination unit extracting an embedding vector corresponding to each segmented text from the preprocessed message to determine whether the transfer information is included in the message through weighted calculation of the extracted embedding vector; and a transfer information classification unit classifying the transfer information in the preprocessed message determined to include the transfer information.

The preprocessing unit may be further configured to segment the message by adding spaces before and after a position of the number or specific word, for the number or specific word included in the message.

The transfer information determination unit may be further configured to determine whether the transfer information is included in the acquired message through a local model operated on the user terminal, and the local model may configured to generate training information of a layer performing internal weighted calculation by using a determination result of whether the transfer information is included in the message.

The local model may configured to update using a master model distributed through federated training with the training information generated from the plurality of user terminals.

The transfer information determination unit may be further configured to determine whether the transfer information is included in the message by using a first expected inclusion probability of the transfer information in the acquired message that is calculated by the local model, and a second expected inclusion probability of the transfer information in the acquired message that is calculated by the master model.

The transfer information classification unit may be further configured to classify the transfer information in the message by using a regular expression that defines a text pattern for each category as grammar.

The transfer information classification unit may be further configured to classify the transfer information in the message by inputting the preprocessed message into a neural network model trained to classify the transfer information.

Meanwhile, according to still another embodiment of the present invention, provided is a computer-readable recording medium storing a program code for executing the method for determining transfer information.

Advantageous Effects

According to the present invention, the classification efficiency of the transfer information in a message may be increased by preferentially determining whether the transfer information is included therein by using the low-capacity embedding-based determination model.

In addition, the transfer information in a message that reflects the personalized feature may be more accurately determined and classified by using the local-based model trained based on the user message.

In addition, the adaptability to the transfer information based on the user feature may be increased while minimizing the usage of the personal information for the training by managing the model that is trained the common feature based on the various user messages and the local-based model independently of each other.

BEST MODE

The following description illustrates only a principle of the present invention. Therefore, those skilled in the art may implement the principle of the present invention and invent various devices included in the spirit and scope of the present invention although not clearly described or shown in the specification. In addition, it is to be understood that all conditional terms and embodiments mentioned in the specification are obviously intended only to assist in understanding a concept of the present invention in principle, and the present invention is not limited to the embodiments and states particularly mentioned as such.

The above-mentioned objects, features and advantages are to be more obvious from the following detailed description provided in relation to the accompanying drawings. Therefore, those skilled in the art to which the present invention pertains may easily practice the spirit of the present invention.

Further, in describing the present invention, omitted is a detailed description of a case where it is determined that the detailed description of well-known technology associated with the present invention may unnecessarily make the gist of the present invention unclear. Hereinafter, the embodiments of the present invention are described in detail with reference to the accompanying drawings.

Figure 1:
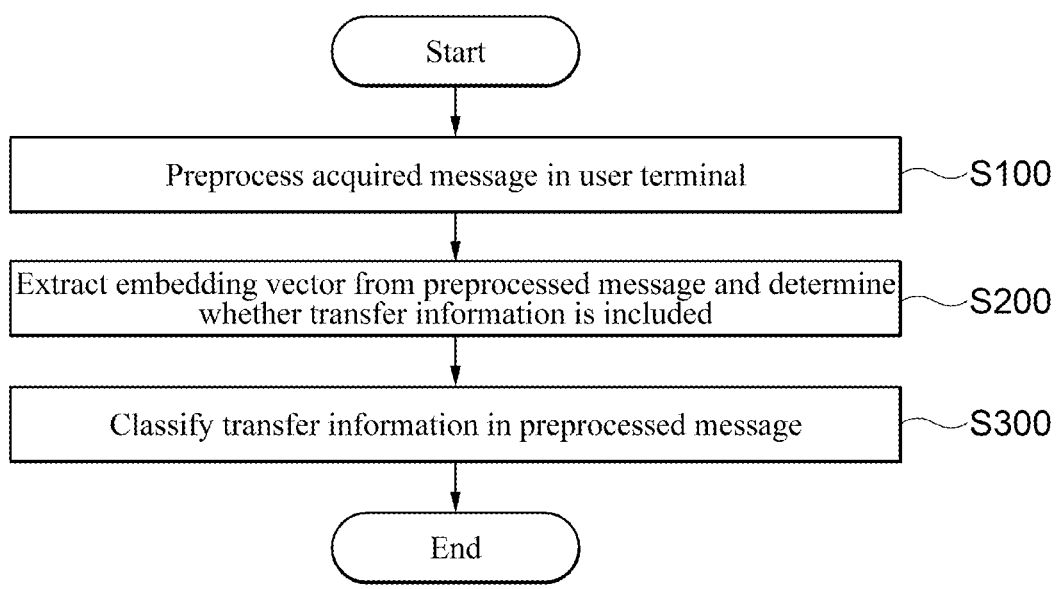
FIG. 1 is a flowchart showing a method for determining transfer information according to an embodiment of the present invention.

FIG. 1 is a flowchart showing a method for determining transfer information according to an embodiment of the present invention.

Referring to FIG. 1, in order to determine transfer information in a received message, a user terminal 100 may preprocess the text information included in the acquired message to classify the text information based on a processing unit (S100).

In this embodiment, the acquired message may include all of a general text message received using a communication network, a message received in the form of e-mail, or messages received through various messenger applications (for example, Kakao Talk messenger) installed on a smartphone.

Alternatively, the acquired message may be all or part of the text information selected by a user's copy request among the various text information stored in the user terminal, regardless of whether the message is received from the outside.

Therefore, in this embodiment, data temporarily stored to be copied to a clip board may be preprocessed as a text requested to be copied by the user's selection among various types of data received in the user terminal 100.

In addition, the acquired message may exist in the form of a screen-captured image of the message, and in the case of the image, the message may be used to recognize the text included in the image and extract the recognized text through character recognition or the like.

As described above, the user terminal 100 in this embodiment may preprocess the data in various forms including the text based on a reference word.

In detail, the user terminal 100 may preprocess the acquired message by segmenting the message by adding spaces before and after the number or a specific word, included in the message. The user terminal 100 may efficiently recognize meaning included in the message by segmenting the text in the preprocessed message into the spaces.

In this embodiment, the specific word that serves as a segmentation reference may be set as a word that indicates a number size such as ten thousand, one thousand, one hundred, or the like, and a word that indicates a value amount such as 'won' based on a purpose of an account transfer. In addition, the specific word may include a word such as dollar, yen, euro, or the like, based on a currency notation method of each country.

Therefore, when the acquired message is "This is Hong Gil-dong. Please send 300,000 won to 123-456-7890 of Kakao Bank," the user terminal 100 may preprocess the message by segmenting the message into "This is Hong Gil-dong. Please send 300,000 won to 123-456-7890 of Kakao Bank" by adding spaces before and after the numbers and the specific words.

Next, the user terminal 100 may determine whether the transfer information is included in the message by inputting the preprocessed message into an embedding-based determination model and calculating an expected inclusion probability of the transfer information (S200).

This configuration is described with reference to FIG. 2.

Figure 2:
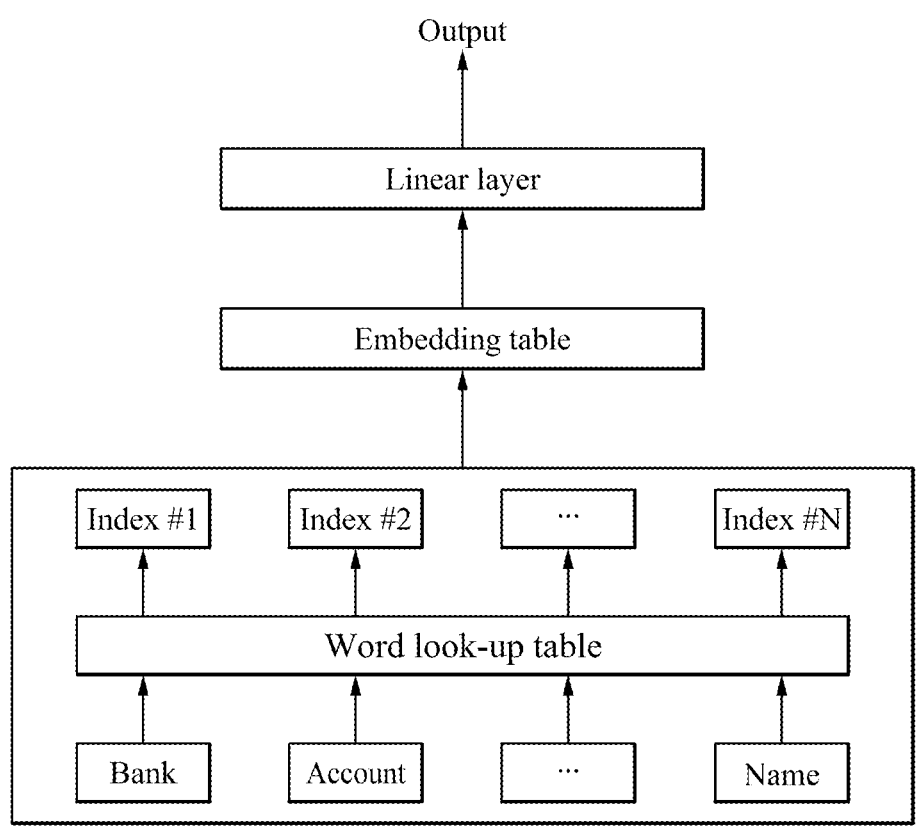
FIG. 2 is an example view showing a structure of a determination model that determines whether transfer information is included in a message according to an embodiment of the present invention.

FIG. 2 is a view showing a configuration of the determination model that calculates the expected inclusion probability of the transfer information according to an embodiment of the present invention.

Referring to FIG. 2, the embedding-based determination model according to this embodiment may extract an index value corresponding to each segmented text of the preprocessed message through a word look-up table.

The word look-up table may be generated in the form of a vocabulary in consideration of a frequency by performing tokenization of separating a sentence in the acquired user message into a word text unit based on the segmentation reference described above, and removing duplicates therefrom.

The vocabulary may be generated through integer encoding in which an identity (ID) such as a numeric index is given to each word.

Next, the user terminal 100 may refer to an embedding table to thus extract embedding vectors corresponding to the index values, and calculate the average value of the extracted embedding vectors.

The embedding table may include expression of words included in a sentence in the form of one-hot encoding or a dense vector based on a set dimension, and may be generated through word embedding. Here, the embedding table may be generated by training a vector expressing an input word in the same way as training a general neural network.

That is, in this embodiment, the regular embedding vector may be extracted by extracting the index value by referring to a word lookup table for the words segmented through the preprocessing, and mapping the information included in the message that corresponds to the index value to a feature space based on the set dimension.

Next, the average of the extracted embedding vectors may be calculated, and whether the meaning included in the message includes the transfer information may be determined through the calculated average.

In detail, the user terminal 100 may calculate the expected inclusion probability by inputting the average value of the embedding vectors into a linear layer. The linear layer for linear calculation may perform a weighted sum of the average vector by using, as a kernel, a predefined weight W and a bias b in the same dimension as the embedding vector.

For example, the average value X of the embedding vector may be {0.13, 0.52, 0.333, 0.446, 0.356, 0.335}, the weight W may be {0.123, −0.44; 0.67, 0.34; 0.33, 082; −0.34, 0.66; —0.33, −0.45; 0.55, 0.89}, and the bias b may be {0.5, −0.52}. In this case, the user terminal 100 may calculate the expected inclusion probability as (c=W*X+b) as {10.3, −0.412}. Here, the probability that the transfer information is included in the message may be 10.3, which is greater than a probability that the transfer information is not included in the message. Accordingly, the user terminal 100 may determine that the transfer information is included in the message.

Through the above process, in this embodiment, it is possible to preferentially determine at a local level whether the transfer information is included in the input message through the embedding-based determination model on the user terminal 100.

Here, a local model may also be trained directly using a result of the embedding-based determination model. That is, the transfer information may be better determined based on the user's unique feature by updating the weight W and the bias b, used in weighted sum calculation, through the training.

Further, the determination model according to this embodiment may collect local-level training results, and use the collected results to improve overall performance of the determination model.

However, personal information, including personal account information, may be included in the message used for training the determination model. Therefore, instead of collecting the messages and a determination result, the central server may collect the training results generated from the local-level determination model used for actual determination.

The server may prevent the personal information from being directly used for the collection and the training by updating a master model by using the collected training results.

Therefore, the embedding-based determination model according to this embodiment may be classified into the local-based determination model (hereinafter, "local model") and the master model managed to be trained by the central server.

As shown in a structure of FIG. 2 described above, the local model and the master model according to this embodiment may all include the vocabulary in which the index and the embedding vector are matched with each other, and an embedding table in which an embedding vector value corresponding to the index is defined, and may output a probability value as the embedding vector generated through the embedding table is weight-calculated by the linear layer.

Therefore, the local-based determination model and the central master model may federally train the central master model by using the locally generated training information through a corresponding structure.

Figure 3:
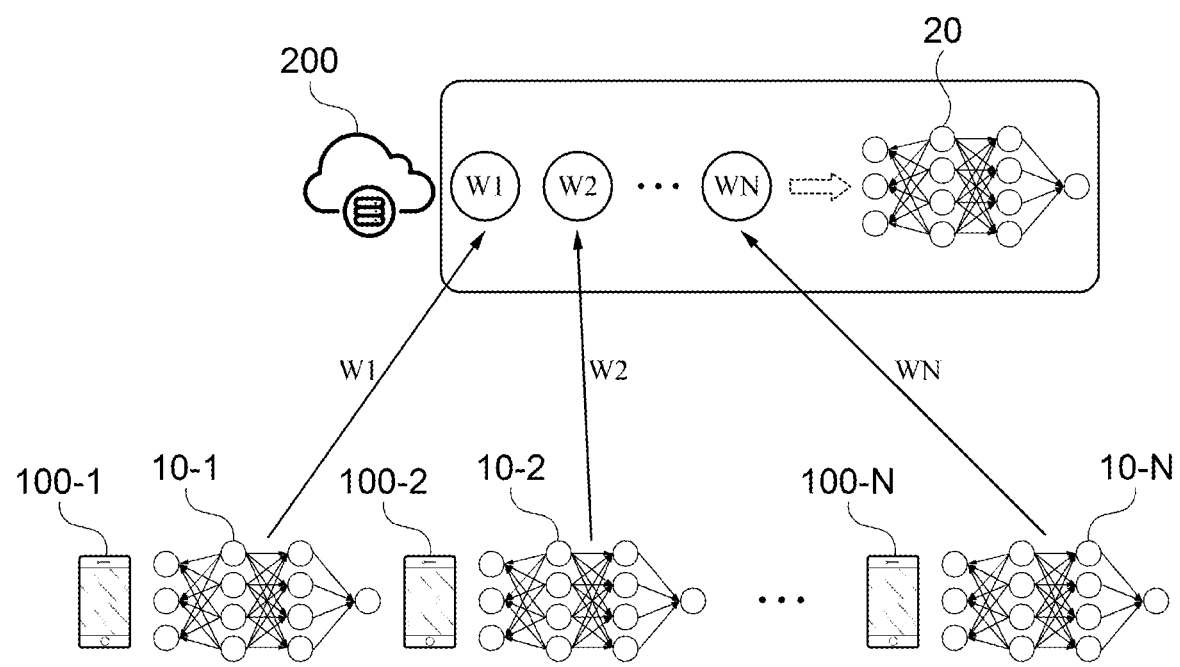
FIG. 3 is an example view showing a federated training process by a local-based determination model and a master model according to an embodiment of the present invention.

In this regard, the description describes a training process according to this embodiment in detail with reference to FIG. 3.

FIG. 3 is an example view showing a federated training process by the local-based determination model and the master model according to an embodiment of the present invention.

Referring to FIG. 3, a management server 200 managing the master model may train a master model 20 by using the training result of the local model generated based on the user message.

Each of user terminals 100-1, 100-2, ..., and 100-N may perform a work in the form of the local model operated by the user terminal itself by receiving the pre-trained and distributed master model 20 from the management server 200 and installing the master model 20 in an operable form through an internal processor.

That is, local models 10-1, 10-2, ..., and 10-N respectively installed in the user terminals 100 may directly determine whether the transfer information is included in the received message without communicating with an external server, and may be retrained by using the determination result.

In detail, the training may be performed to reduce an error occurring between a predicted value of the local model and a ground truth, and the message copied by the user and whether the financial application is executed may be used as labeling values used for the training immediately after copying the message.

The neural network in the local model may define, as the error, a difference between the ground truth (e.g., a value of 1 when the financial application is executed, and zero otherwise) and the predicted value, and calculate an updated value of the weight of an internal layer to minimize the error.

Here, the master model distributed to each user terminal 100 may reflect the locally performed training process to thus be trained on a transfer information feature based on various environments, and have adaptive performance even for a personalized message writing method.

In detail, the management server 200 may receive the updated value from each local model and use the same for the training instead of collecting the message received by each user terminal 100 and the labeling value that defines whether the message includes the transfer information.

Therefore, the management server 200 may improve the performance of the master model by receiving updated weights W1, W2, ..., and WN generated from the respective local models as the training results from the plurality of user terminals 100-1, 100-2, ..., and 100-N, collecting the plurality of received weights, and updating the weights of the internal layer.

As an example of the collection, the management server 200 may calculate the average of the plurality of weights W1, W2, ..., and WN received from the plurality of user terminals 100-1, 100-2, ..., and 100-N, and then use the calculated average value as a weight for updating the master model. The master model trained through the above process may be managed as a version, and the master model updated to a new version may be operated as the local model by being redistributed to and reinstalled in each user terminal 100-1, 100-2, ..., or 100-N.

In addition, the management server 200 may train the master model by further using user information in the collection, that is, by using the user's age, gender, transfer amount, or the like to thus distinguish an expression method of the transfer amount for each age and an expression method of a bank name for each age. Therefore, the master model may be managed and trained in detail based on the user feature to enable more accurate prediction.

Furthermore, the user terminal 100 in this embodiment may use the local model and the master model independently of each other, and use each prediction result to more accurately determine whether the transfer information is included in the message.

That is, the local model that provides the weight may have better performance for a personalized feature of the local user by being trained using the local-level training result. On the other hand, the master model may be trained to reflect the vast majority of common features of the transfer information, and may have better performance for a new type of message.

Therefore, the user terminal 100 may determine whether the transfer information is included in the message by using both the prediction result of the local model trained a unique pattern included in the user message and the new version of the master model based on a previous master model distributed after the federated training.

For example, the user terminal 100 may determine whether the transfer information is included in the message by using the average of a first expected inclusion probability of the transfer information in the acquired message that is calculated by the local model and a second expected inclusion probability of the transfer information in the acquired message that is calculated by the master model.

In this way, the user terminal 100 may accurately determine whether the transfer information is included in the message by using both the result reflecting another user's feature and the result reflecting the user's own feature.

Next, the user terminal 100 may determine whether the message includes the transfer information by using the determination model trained through the above processes (S100 and S200), and the user terminal 100 may classify the transfer information in the preprocessed message when the transfer information is included in the message (S300).

Figure 4:
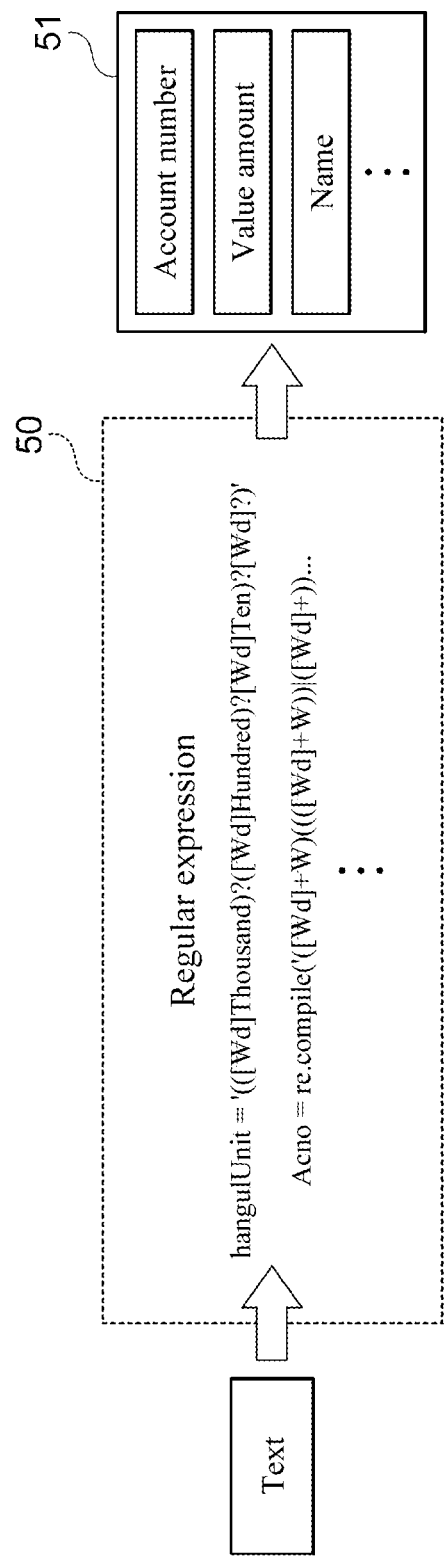
FIG. 4 is an example view showing a regular expression-based classification model for transfer information classification in the method for determining transfer information according to an embodiment of the present invention.

First, referring to FIG. 4, the user terminal 100 may classify transfer information 51 included in the message through pattern matching based on a predetermined regular expression 50.

In detail, the regular expression may define the value amount, the bank, and a unique pattern of an account based on grammar, and the user terminal 100 may thus extract relevant information from the message determined to include the transfer information.

For example, the account pattern may be defined as a pattern including the number consisting of 10 or more consecutive digits, a combination of the number and a hyphen (-), or a unique sequence of numbers determined for each bank which is repeated and consists of 10 or more consecutive digits.

In addition, in the case of value amount, a string may be defined as the regular expression, the string having a pattern such as a combination of an arithmetic number including decimal points and a value amount unit in Korean characters (for example, 5,000 won, or 52,000 won) or a combination of the number and the value amount unit only in Korean characters (for example, twenty thousand won or five thousand won).

In addition, in the case of the bank, a string that ends with a term referring to a bank, such as OO financial Service or OO BANK, or a commercial bank may be defined and stored as its pattern.

Therefore, the user terminal 100 may classify a text corresponding to the bank name, an account number, or an account holder name in the preprocessed message through the pattern matching of the regular expression.

In addition, the user terminal 100 may calculate the prediction result from the preprocessed message by using the pre-trained neural network model, and classify the transfer information in the message based on the calculated prediction result. Here, the neural network model may be trained to calculate the prediction result for each segmented text of the preprocessed message.

This configuration is described with reference to FIGS. 5 and 6.

Figure 5:
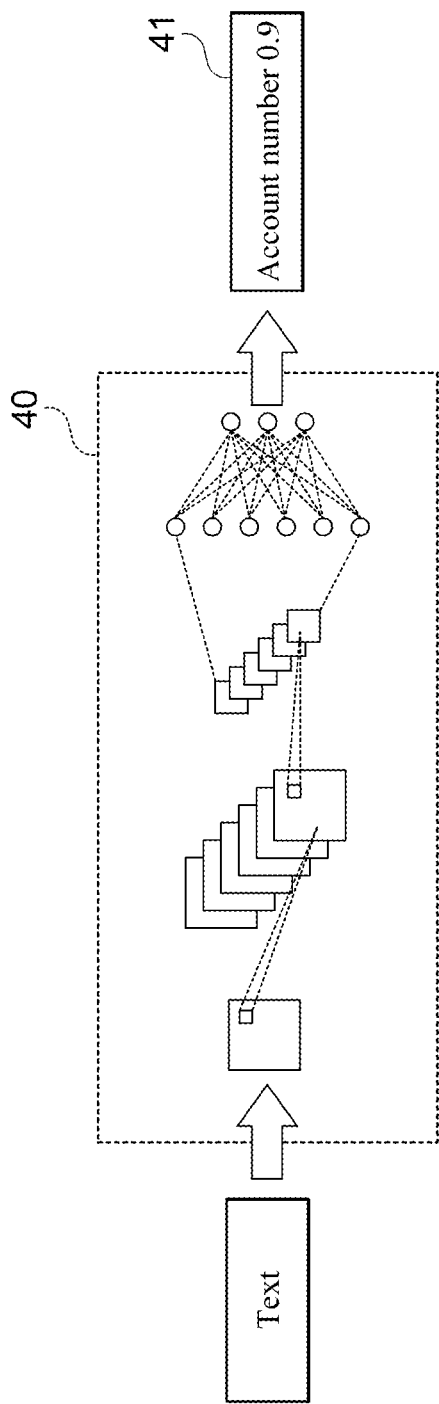
FIG. 5 is an example view showing a neural network model for the transfer information classification in the method for determining transfer information according to an embodiment of the present invention.

First, referring to FIG. 5, a neural network model 40 according to this embodiment may include a convolution neural network (CNN) model including layers that performs multiple convolution calculations.

The user terminal 100 may predict a type of the text by inputting, into the neural network model 40, the segmented text of the preprocessed message, preferably the embedding vector for the text. A feature value in the text that is input to the neural network model 40 may be generated in the form of a feature map as the value goes through each convolution layer, and the feature map generated through the repeated calculation may be calculated as a classified prediction result 41 by a fully-connected layer. The user terminal 100 may classify the segmented text based on the above calculated prediction result.

Figure 6:
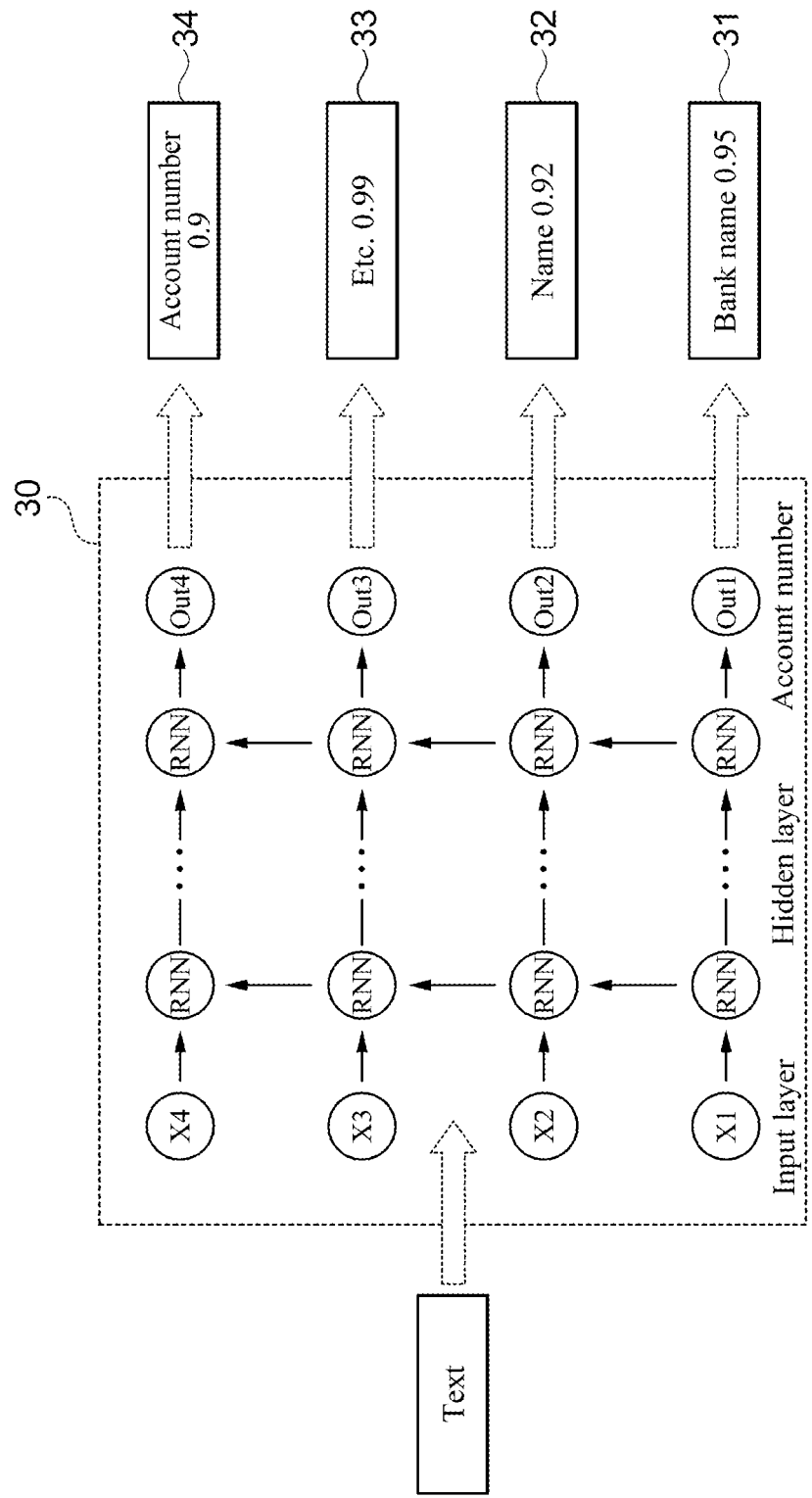
FIG. 6 is an example view showing a neural network model for the transfer information classification in another example of the method for determining transfer information according to an embodiment of the present invention.

Alternatively, referring to FIG. 6, a neural network model 30 according to this embodiment may include a recurrent neural network (RNN) model that recognizes the pattern in continuous data.

The user terminal 100 may extract the segmented text in the preprocessed message and the embedding vector based on the index value of the text, respectively, and sequentially input the extracted embedding vectors into the neural network model 30.

The neural network model 30 may input the embedding vectors sequentially input to an input layer into a hidden layer of the RNN model, and an RNN node may perform the calculation by using an output of a surrounding RNN node along with an output of a previous layer.

Therefore, the neural network model 30 may calculate the classified result based on a sequential correlation of the segmented text as the predicted value.

For example, a plurality of prediction results 31, 32, 33, and 34 may be calculated for unit texts X1, X2, X3, and X4 sequentially input using the neural network model 30. In this case, the user terminal 100 may classify the text X1 as the bank name among the transfer information based on the first prediction result 31, classify the text X2 as the name among the transfer information based on the second prediction result 32, classify the text X3 as a text unrelated to the transfer information based on the third prediction result 33, and classify the text X4 as the account number among the transfer information based on the fourth prediction result 34.

As described above, according to this embodiment, the user terminal 100 may preferentially determine whether the transfer information is included in the message through the simplified determination model, and when the transfer information is included in the message, the user terminal 100 may use the regular expression or an additional neural network to classify the transfer information to enable more efficient processing.

Figure 7:
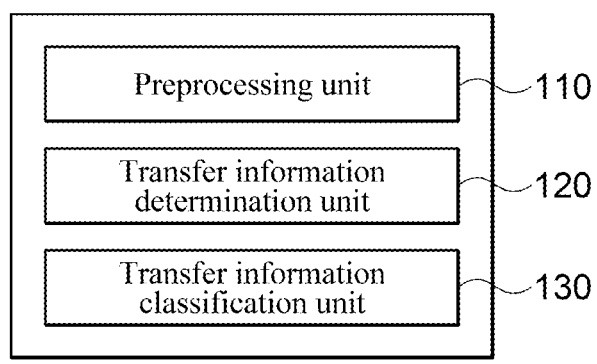
FIG. 7 is a block diagram showing a configuration of an application operated on a user terminal and determining transfer information in a message according to another embodiment of the present invention.

Next, the description describes a configuration of an application performing the above-described method for determining transfer information with reference to FIG. 7.

FIG. 7 is a block diagram showing a structure of an application operated on a user terminal 100 according to an embodiment of the present invention.

Referring to FIG. 7, the application on the user terminal 100 may include a preprocessing unit 110, a transfer information determination unit 120, and a transfer information classification unit 130.

The preprocessing unit 110 may preprocess an acquired message in the user terminal 100 to determine transfer information in the message.

In detail, the preprocessing unit 110 may preprocess the acquired message by segmenting the message by adding spaces before and after the number or a specific word included in the acquired message.

The transfer information determination unit 120 may determine the presence or absence of the transfer information in the message by calculating the expected inclusion probability of the transfer information in the preprocessed message based on an embedding-based determination model.

In detail, the transfer information determination unit 120 may determine whether the transfer information is included in the message by extracting an embedding vector corresponding to each segmented text from the preprocessed message, calculating the average value of the extracted embedding vectors, then calculating the expected inclusion probability by calculating a weighted sum based on a local model, and comparing the calculated expected inclusion probability with a reference value.

The transfer information determination unit 120 may generate an updated value of an internal layer of the local model, the updated value being able to be used for training the model, by determining whether the transfer information is included in the message, and simultaneously, using, as a ground truth, a fact whether a user transfers the transfer information or a result of transfer information modification or edition.

The transfer information classification unit 130 may classify the transfer information included in the message through pattern matching based on a predetermined regular expression.

In addition, the transfer information classification unit 130 may calculate a prediction result from the preprocessed message by using a pre-trained neural network model, and classify the transfer information in the message based on the calculated prediction result.

According to the present invention described hereinabove, the classification efficiency of the transfer information in a message may be increased by preferentially determining whether the transfer information is included therein by using the low-capacity embedding-based determination model.

In addition, the transfer information in a message that reflects the personalized feature may be more accurately determined and classified by using the local-based model trained based on the user message.

In addition, the adaptability to the transfer information based on the user feature may be increased while minimizing the usage of the personal information for the training by managing the model that is trained the common feature based on the various user messages and the local-based model independently of each other.

Furthermore, the various embodiments described herein may be implemented in a computer-readable recording medium or a device similar thereto by using, for example, software, hardware, or a combination thereof.

According to a hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, the embodiments described in the specification may be implemented by a control module itself.

According to a software implementation, the embodiments such as procedures and functions described in the specification may be implemented by separate software modules. Each of the software modules may perform one or more functions and operations described in the specification. A software code may be implemented as a software application written in a suitable programming language. The software code may be stored in a memory module and executed by the control module.

The spirit of the present invention has been illustratively described hereinabove. It is to be appreciated by those skilled in the art to which the present invention pertains that various modifications, alterations and substitutions may be made without departing from the essential features of the present invention.

Accordingly, the embodiments and the accompanying drawings disclosed in the present invention are provided not to limit the spirit of the present invention, but to fully describe the present invention, and the scope of the present invention is not limited to the embodiments or the accompanying drawings. The scope of the present invention should be interpreted by the following claims, and all the spirit equivalent to the following claims should be interpreted to fall within the scope of the present invention.

The invention claimed is:

1. A method for determining transfer information for financial applications in a message through natural language processing based on deep learning implemented by a user terminal comprising a processor, the method comprising:
   preprocessing, by the processor, an acquired message in the user terminal based on a reference word;
   extracting, by the processor, an embedding vector corresponding to each segmented text from the preprocessed message;
   determining, by the processor, whether the transfer information is included in the acquired message using a first expected inclusion probability calculated by a local model, which is operated on the user terminal by installing a master model distributed from a server through weighted calculation of the extracted embedding vector, and a second expected inclusion probability calculated by the master model; and
   classifying, by the processor, the transfer information in the preprocessed message determined to include the transfer information,
   wherein the determining, by the processor, whether the transfer information is included in the acquired message comprises using the local model by installing the master model, which is redistributed from the server after federated training with a weight update value of an internal layer performing weighted calculation, the weight update value being generated according to a determination result of the local model and collected as training information.

2. The method of claim 1, wherein the preprocessing, by the processor, the acquired message comprises segmenting the acquired message by adding spaces before and after a position of a number or specific word, for the number or specific word included in the acquired message.

3. The method of claim 1, wherein the local model updates using the master model distributed through the federated training with training information generated from a plurality of user terminals.

4. The method of claim 1, wherein the classifying, by the processor, the transfer information comprises classifying the transfer information in the acquired message by using a regular expression that defines a text pattern for each category as grammar.

5. The method of claim 1, wherein the classifying, by the processor, the transfer information comprises classifying the transfer information in the acquired message by inputting the preprocessed message into a neural network model trained to classify the transfer information.

6. A user terminal for determining transfer information for financial applications in a message, the user terminal comprising:
   at least one processor; and
   non-transitory computer-readable recording medium storing program code that, when executed by the processor, performs steps comprising:
   preprocessing an acquired message in the user terminal based on a reference word;
   extracting an embedding vector corresponding to each segmented text from the preprocessed message;
   determining whether the transfer information is included in the acquired message using a first expected inclusion probability calculated by a local model, which is operated on the user terminal by installing a master model distributed from a server through weighted calculation of the extracted embedding vector, and a second expected inclusion probability calculated by the master model; and
   classifying the transfer information in the preprocessed message determined to include the transfer information,
   wherein the determining whether the transfer information is included in the acquired message comprises using the local model by installing the master model, which is redistributed from the server after federated training with a weight update value of an internal layer performing weighted calculation generated according to a determination result of the local model and collected as training information.

7. The user terminal of claim 6, wherein the preprocessing the acquired message comprises segmenting the acquired message by adding spaces before and after a position of a number or specific word, for the number or specific word included in the acquired message.

8. The user terminal of claim 6, wherein the local model updates using the master model distributed through the federated training with training information generated from a plurality of user terminals.

9. The user terminal of claim 6, wherein the classifying the transfer information comprises classifying the transfer information in the acquired message by using a regular expression that defines a text pattern for each category as grammar.

10. The user terminal of claim 6, wherein the classifying the transfer information comprises classifying the transfer information in the acquired message by inputting the preprocessed message into a neural network model trained to classify the transfer information.

11. A non-transitory computer-readable recording medium storing program code that, when executed by at least one processor of a user terminal, causes the user terminal to perform steps for determining transfer information for financial applications comprising:
   preprocessing an acquired message in the user terminal based on a reference word;
   extracting an embedding vector corresponding to each segmented text from the preprocessed message;
   determining whether the transfer information is included in the acquired message using a first expected inclusion probability calculated by a local model, which is operated on the user terminal by installing a master model distributed from a server through weighted calculation of the extracted embedding vector, and a second expected inclusion probability calculated by the master model; and
   classifying the transfer information in the preprocessed message determined to include the transfer information,
   wherein the determining whether the transfer information is included in the acquired message comprises using the local model by installing the master model, which is redistributed from the server after federated training with a weight update value of an internal layer performing weighted calculation, the weight update value being generated according to a determination result of the local model and collected as training information.

* * * * *